Figure 1:
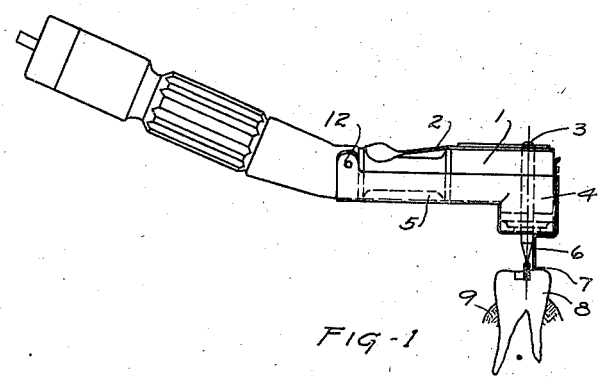

Sept. 7, 1937.   J. L. AUSTIN   2,092,689
GAUGE FOR DENTAL INSTRUMENTS
Filed Dec. 16, 1935

INVENTOR.
J. LUTHER AUSTIN.,
BY Carmack Waterhouse
ATTORNEY.

Patented Sept. 7, 1937

2,092,689

UNITED STATES PATENT OFFICE 2,092,689

GAUGE FOR DENTAL INSTRUMENTS

John Luther Austin, Chattanooga, Tenn.

Application December 16, 1935, Serial No. 54,561

5 Claims. (Cl. 32—49)

My invention relates to gauges and guides and more particularly to gauges for hand pieces or drilling instruments employed by the dentist in the drilling of teeth and the like.

In drilling cavities in teeth for the purpose of filling them it has been the practice of the dentist to employ an appropriate burr rotatably secured in a dental hand piece (of various shapes) or tool driven by electrically operated power equipment. It has always necessarily been the practice for the dentist, without any form of instrument for gauging the depth of cutting, to apply the burr to the tooth by exerting pressure through the hand piece. The whole operation depended upon the steady hand and experienced judgment of the dentist. Often in the outset of drilling a cavity or in further grinding it, where hard and soft portions were encountered, the revolution of the burr and the pressure of the hand would cause the burr to penetrate too deep into the tooth thereby coming too close or exposing the nerve, or causing the burr to be unseated and dig into the mouth, gum or other teeth of the patient resulting in great pain and injury. Under the conditions of inadequate space and light, and with the fear that injury may be occasioned by the drill, the dentist is always under a great strain and is forced to devote long periods of time to drilling which wears heavily upon the nerves of both himself and the patient. During the operation he has no assurance that the opening is properly drilled and that the nerve has been approached too closely for there is neither guide nor gauge to assist him.

In the event of necessity for drilling out a cavity on the side of a tooth or forming a groove or wall upon which a bridge or crown may be hung it is desired to form an opening of smooth or even depth, or to remove a portion of a side of a tooth to give a uniform wall across the thickness of such tooth. It is impossible for the dentist to accomplish this result by depending upon the use of an ungauged hand instrument, held freely in his hand, and pressed to the desired depth. This hand controlled and gauged instrument is continually subject to the tendency of slipping, therefore a uniform cut across the thickness of the tooth is made impossible, and the drilling time and danger of coming too close or exposing a nerve are greatly increased.

In the prior art of dental instruments for drilling teeth for crowns or bridges there has been some attempt to provide a cutter shank with a guide to prevent it from slipping from the tooth to others and to the gums and mouth, and for the purpose of forming a uniform beveled surface on the root of the tooth. However, such a device was never intended for drilling cavities as the guide is generally secured directly to the cutter shaft by a sleeve which must be secured to a socket and to the root of a tooth to prevent rotation.

With a knowledge of the defects in and objections to the prior art it is an object of my invention to provide a gauge for the hand piece of a dental drill whereby it is impossible to come too close or expose a nerve when drilling a tooth either in the top or side thereof.

It is a further object of my invention to provide a gauge and guide for a handpiece having a finger which closely parallels the burr and extends beyond its length whereby to engage the surface of the tooth and guide the burr when drilling along the sides of the tooth so that a smooth wall may result, and to limit the distance into the tooth that the burr may penetrate, thus protecting the nerve. Such finger will also serve to protect adjacent teeth from engagement and injury by the burr.

It is a further object of my invention to provide a gauge for a dental hand piece having a finger paralleling the burr and an outturned end for limiting the depth to which the burr may penetrate by its engagement with the surface of the tooth.

It is a further object of my invention to provide a gauge and guide for a dental hand piece to limit the penetration of a burr whereby to speed up the drilling operation and relieve the strain of the operator from fear of getting too close or exposing a nerve.

Other objects and advantages of my invention will appear in the following specification, and the novel features of the invention will be particularly pointed out in the annexed claims.

Figure 2:
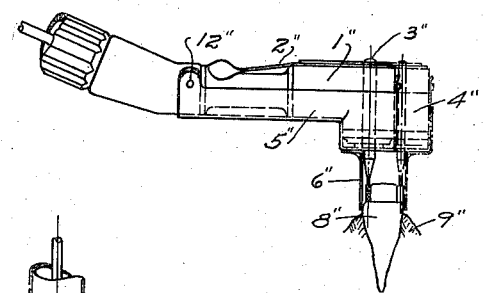
Figures 5, 6, 7:
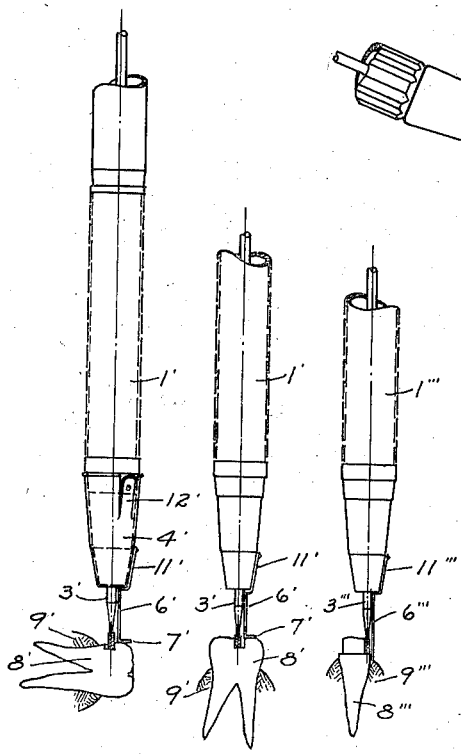
Figure 3:
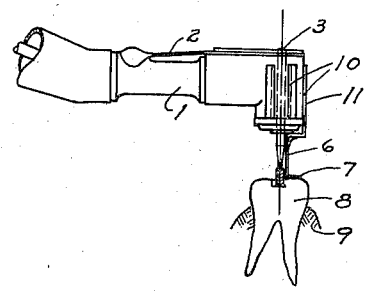
Figure 4:
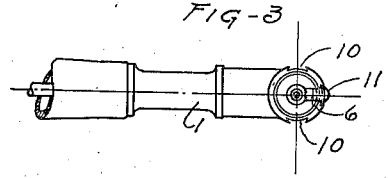
Figures 8, 9:
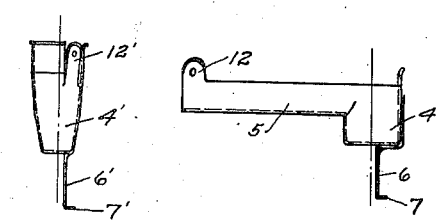

Figure 1 shows an angled dental hand piece for drilling a cavity in the top of a tooth by the aid of my improved gauge. Figure 2 shows an angled hand piece drilling in the side wall of a tooth employing other forms of my improved gauge. Figure 3 shows an angled hand piece employing a tongue and groove socket connection for my improved gauge. Figure 4 shows a plan view of an angled hand piece disclosing the grooves in detail. Figures 5 and 6 disclose a straight hand piece drilling a cavity in a tooth employing my improved gauge. Figure 7 discloses a straight hand piece drilling the side wall of a tooth with the assistance of my improved gauge. Figures 8 and 9 disclose forms of my improved gauge for application to straight and angled hand pieces respectively.

In the drawing 1 designates the body of an angled or contra angle hand piece cooperating at one end with a dental machine for driving and at the other providing a socket extending transversely thereof for the reception of the shank of a drilling tool 3 which is maintained in assembled relation by means of the usual tool latch 2, 4 designates a socket for the reception of the head of a hand piece 1, and 5 designates an arm extending rearwardly from the socket 4 and along and about the body of the hand piece 1 and secured in position by appropriate wings 12 which may at option employ openings therein for reception of pins on the body 1. An appropriate head and pin on the socket and head may also cooperate to secure the attachment in place. Either formed as a part of the socket 4 or secured thereto is a finger 6 which extends transversely therefrom and in assembled position parallels the burr of cutting tool 3 down to a point adjacent its end where the finger is turned outwardly to form an abutment 7 which engages the tooth 8, set in gum 9, as the burr of cutting tool 3 has penetrated its proper depth in such tooth, thereby forming a precision gauge which will not permit the burr to get too close or expose a nerve regardless of the pressure placed upon the hand piece by the dentist.

In Figure 2 there is disclosed two modified forms of gauges applied to the outer surfaces or side walls of the tooth for removing a portion. The instrument in solid lines is employed on the front of the tooth where the gauge acting through finger 6″, which closely parallels the burr through its entire length, and extends on beyond it, engages with its free end the wall of the tooth 8″ below the area which is being ground and limits the movement of the burr in its penetration into the tooth and removes danger of getting too close or exposing a nerve. The finger 6″ performs another and equally important function, for it may be moved along the surface indicated and guide the burr to an almost unprecedented even cut across the side of the tooth producing a smooth and even wall of uniform depth which could never result from the ungauged and unguided use of the dental hand piece with only the judgment and estimation of a dentist using it free hand.

The instrument in dotted lines is employed on the rear of the tooth where the gauge acting through the finger 6″ functions in a manner similar to that described in connection with the instrument shown in solid lines.

Another important characteristic of both of these forms is that the finger 6″ in either position falls between the tooth ground and adjacent teeth thereby protecting them from any possible injury.

In the form disclosed in Figures 3 and 4 the socket 4 and arm 5 have been replaced by another type of securing means of the tongue and groove form. Beveled grooves 10 are formed in the head of hand piece 1 at a plurality of places to cooperate with and receive tongues 11 formed as a part of the gauge for securing it in position on the head.

In Figure 5 a straight hand piece is disclosed where 1′ designates the straight hand piece with a cutting tool 3′ seated and secured in a conventional socket therein. 4′ designates a socket for the reception of the head of the hand piece 1′, and from which a finger 6′ extends longitudinally, which finger is either a part thereof in making or is later secured thereto, said finger extending along and closely paralleling the burr of tool 3′ to a point adjacent its end where said finger is turned outwardly to form an abutment 7′ serving to limit the depth to which the burr may sink in tooth 8′ set in gum 9′ when a cavity is being drilled.

Figure 6 discloses the same form except that the gauge is positioned on the hand piece by a tongue and groove arrangement 11′ similar to that employed in Figures 3 and 4.

In Figure 7 the finger 6‴ closely parallels the burr of tool 3‴ through its length and extends to a point beyond it to perform the same function in this hand piece as the gauge of Figure 2 performs in the angled hand piece.

Figure 8 clearly discloses a wing 12′ formed by slitting the sides of socket 4′ and bending outwardly leaving a slot into which a pin or screw on the hand piece 1′ may rest to prevent rotation of the socket 4′. An opening in wing 12′ may receive a pin.

Having thus described my invention, I claim:

1. In a dental instrument of the character described, a hand piece including a head, a socket in said head, a cutting tool having one end seated and rotatably secured therein, a cutting surface formed on the other end of said tool, a gauge for said hand piece comprising a thin, flat strip of uniform cross-section secured to said head and extending along and closely paralleling the cutting tool but having its plane outside the surface of the burr for engagement with a tooth for limiting the penetration of the cutting tool.

2. In a dental instrument of the character described, a hand piece including a head, a socket formed in said head, a cutting tool having an end secured therein, a cutting surface adjacent the free end of said cutting tool, and a gauge limiting the penetration of said cutting tool comprising a finger of regular contour throughout its length extending along and closely paralleling said tool and to a point beyond its free end whereby to engage and freely traverse the surface of a tooth, and means for securing said finger to said hand piece.

3. In a dental instrument of the character described, a hand piece including a head, a socket formed in said head, a cutting tool having an end secured therein, a cutting surface adjacent the free end of said tool, and a gauge limiting the penetration of said cutting tool comprising a finger having a cross-section of similar configuration throughout its length extending along and closely paralleling said tool and to a point beyond its free end whereby to engage and freely traverse the surface of the tooth, and means for securing said finger to said hand piece, said means comprising a portion providing a socket receiving said head.

4. In a dental instrument, a hand piece including a head, a socket formed in said head, a cutting tool having one end rotatably secured in said socket, a cutting surface adjacent the free end thereof, and a gauge limiting the penetration of said tool comprising a finger extending along and closely paralleling said tool but of less length, and a turned out portion on the end of said finger whereby to form an abutment, and means for securing said finger to said head.

5. In a dental instrument of the character described, a hand piece including a head, a socket formed in said head, a cutting tool having one end rotatably secured therein, a cutting surface adjacent the free end thereof, and a gauge limiting the penetration of said tool comprising a finger extending along and closely paralleling said tool but of less length, and a turned out portion on the end of said finger whereby to form an abutment, and means for securing said finger to said hand piece, said means comprising a portion providing a socket receiving said head.

J. LUTHER AUSTIN.